United States Patent [19]

Tomiyama et al.

[11] Patent Number: 4,914,679
[45] Date of Patent: Apr. 3, 1990

[54] FUEL ASSEMBLY

[75] Inventors: Akio Tomiyama, Hitachi; Osamu Yokomizo, Ibaraki; Yasuhiro Masuhara, Katsuta; Toshitsugu Nakao, Hitachi; Shin-ichi Kashiwai, Hitachi; Yoshishige Kawada, Hitachi; Hiromasa Hirakawa, Hitachi; Shigeto Murata, Katsuta, all of Japan

[73] Assignee: Hitachi, Ltd., Tokyo, Japan

[21] Appl. No.: 223,639

[22] Filed: Jul. 25, 1988

[30] Foreign Application Priority Data

Jul. 27, 1987 [JP] Japan .................................. 62-187244
Mar. 16, 1988 [JP] Japan .................................. 63-60416
Jun. 10, 1988 [JP] Japan .................................. 63-141739

[51] Int. Cl.4 ............................................. G21C 15/00
[52] U.S. Cl. ..................................... 376/440; 376/446
[58] Field of Search .................................. 376/440, 446

[56] References Cited

U.S. PATENT DOCUMENTS 3,864,211 2/1975 King ..................................... 376/440
4,664,882 5/1987 Doshi ................................... 376/423

FOREIGN PATENT DOCUMENTS 2018324 12/1970 Fed. Rep. of Germany .
3228380 2/1984 Fed. Rep. of Germany .
3427372 2/1985 Fed. Rep. of Germany .

Primary Examiner—Donald P. Walsh
Attorney, Agent, or Firm—Antonelli, Terry & Wands

[57] ABSTRACT

A fuel assembly according to the present invention is formed in such a manner that the small diameter portion of an upper end plug of a fuel rod is inserted into a boss of an upper tie-plate. The upper end plug includes a small diameter portion and a large diameter portion which is disposed below the former. An expansion spring in disposed in the small diameter portion of the upper end plug. A cover member surrounding this expansion spring is disposed in the large diameter portion of the upper end plug, and extends upwardly. Since the cover member surrounds the expansion spring, pressure loss caused by the expansion spring can be reduced.

15 Claims, 11 Drawing Sheets

FUEL ASSEMBLY

BACKGROUND OF THE INVENTION

This invention relates to a fuel assembly, and more particularly to a fuel assembly that is suitable for use in boiling water reactors The upper structure of a conventional fuel assembly for use in boiling water reactors is constituted, as disclosed in Japanese Patent Laid-Open No. 58-113891, in such a manner that an upper end plug is provided at the top end of fuel rods, and an expansion spring is secured to each upper end plug for insertion into an upper tie plate. In the conventional example, even if a large amount of axial thermal expansion is generated in the fuel rod, the security of the fuel rod can be maintained by providing the expansion spring with a conical form.

However, such a fuel assembly is required to have its pressure loss reduced. Particularly in a case where the fuel assembly is mounted in the core of a boiling water reactor, the pressure loss is larger in the two-phase flow region (the upper portion of the fuel assembly) in which both liquid and vapor are present than in the single-phase flow region in which only the liquid in the fuel assembly is present.

SUMMARY OF THE INVENTION

It is a first object of the present invention to provide a fuel assembly in which the pressure loss caused by the presence of a coil spring disposed for the upper end plug can be reduced.

It is a second object of the present invention to provide a fuel assembly in which the pressure loss caused by the presence of an upper tie plate can be reduced.

It is a third object of the present invention to provide a fuel assembly in which a generation of fretting corrosion in a fuel rod can be restricted.

A first characteristic of the present invention lies in that a cover means is provided for either a fuel rod or an upper plate, and the cover means surrounds at least one part of the expansion spring in the axial direction thereof. This characteristic enables the first object of the present invention to be achieved.

A second characteristic which allows the second object of the present invention to be achieved lies in that the wall thickness of bosses and ribs is gradually decreased in an outlet portion of a coolant passage formed in the upper tie plate in the direction of an outlet.

The above-described third object can be achieved by virtue of a third characteristic of the present invention which lies in that an upper end plug is provided with a cover means which is provided within a large-diameter portion in the lower portion of the upper end plug, and the cover means extends upwardly in the axial direction and surrounds the expansion spring which is disposed between the boss and the large-diameter portion.

DETAILED DESCRIPTION OF THE PREFERRED EMBODIMENTS

This invention was achieved after undertaking detailed studies of the pressure loss experienced with a conventional fuel assembly which is formed in such a manner that fuel rods are disposed in an 8×8 configuration and, more particularly, by studying the components of the pressure loss in the upper portion of such a fuel assembly which serves as a two-phase flow region in which coolant flows in the form of two phases (liquid and vapor).

Figure 1:
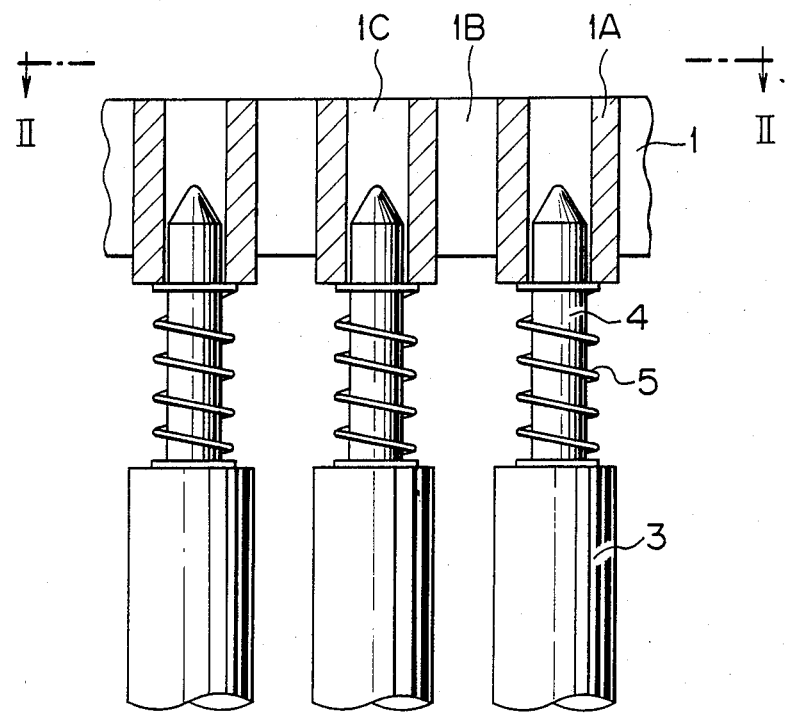
FIG. 1 is a structural view of an upper end plug portion of a conventional fuel assembly.
Figure 2:
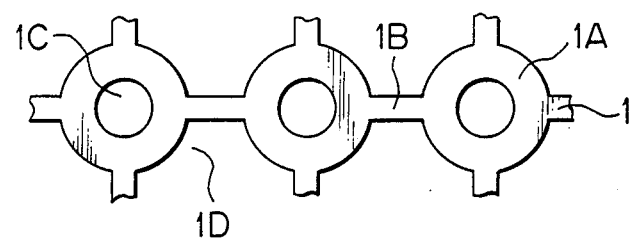
FIG. 2 is a cross-sectional view taken along the line II—II in FIG. 1.

Before describing the results of these studies, the schematic structure of a conventional fuel assembly for a boiling water reactor will be described with reference to FIGS. 1 and 2. An upper tie plate 1 comprises a plurality of cylindrical bosses 1A which are disposed in a lattice manner, and is formed by having these bosses 1A connected together by ribs 1B. Upper end plugs of fuel rods 3 are inserted into holes 1C in the bosses 1A. An expansion spring 5 in the form of a coil is fitted to the upper end plug 4. This expansion spring 5 contacts with the lower side of the boss 1A at one end thereof, and causes the fuel rod 3 to abut against a lower tie plate (not shown) which is disposed in the lower portion.

A large pressure loss is generated in the two-phase flow region of the fuel assembly. The inventor studied the pressure loss occuring in an upper tie plate portion (in the upper portion of the fuel assembly) in the two-phase flow region where the structure is very complicated. The coolant which has passed between the fuel rods 3 passes through a flow area 1D surrounded by the bosses 1A and ribs 1B, and then flows to the portion above the tie plate 1. As can be clearly seen from FIG. 1, the flow area is increased at the portion where the upper end plugs 4 of the fuel rods 3 are present while it is reduced in the upper tie plate 1. The flow area is again increased at the outlets of the upper tie plate 1. As a result, pressure loss is generated due to the three sudden change of the flow area. Furthermore, the pressure loss caused by the presence of the expansion springs 5 and the other type of pressure loss resulting from the friction between the coolant and the walls of the fuel rods 3 and the upper tie plate 1 are generated. The various types of pressure loss generated in the upper portion of the conventional fuel assembly (conventional 8×8 fuel assembly) are shown in Table 1.

TABLE 1

| | Type of Pressure Loss | Percentage |
|---|---|---|
| Position of Upper end plug | Pressure loss due to enlargement of the flow area $\Delta P_a$ | 28% |
| | Pressure loss caused by expansion spring $\Delta P_s$ | 12% |
| | Pressure loss caused by reduction in flow area (boss) $\Delta P_b$ | 25% |
| Upper Tie Plate | Pressure loss caused by reduction in flow area (boss) $\Delta P_c$ | 5% |
| | Pressure loss caused by enlargement of flow area at outlet $\Delta P_d$ | 27% |
| | Pressure loss due to friction $\Delta P_f$ | 3% |

Figure 3:
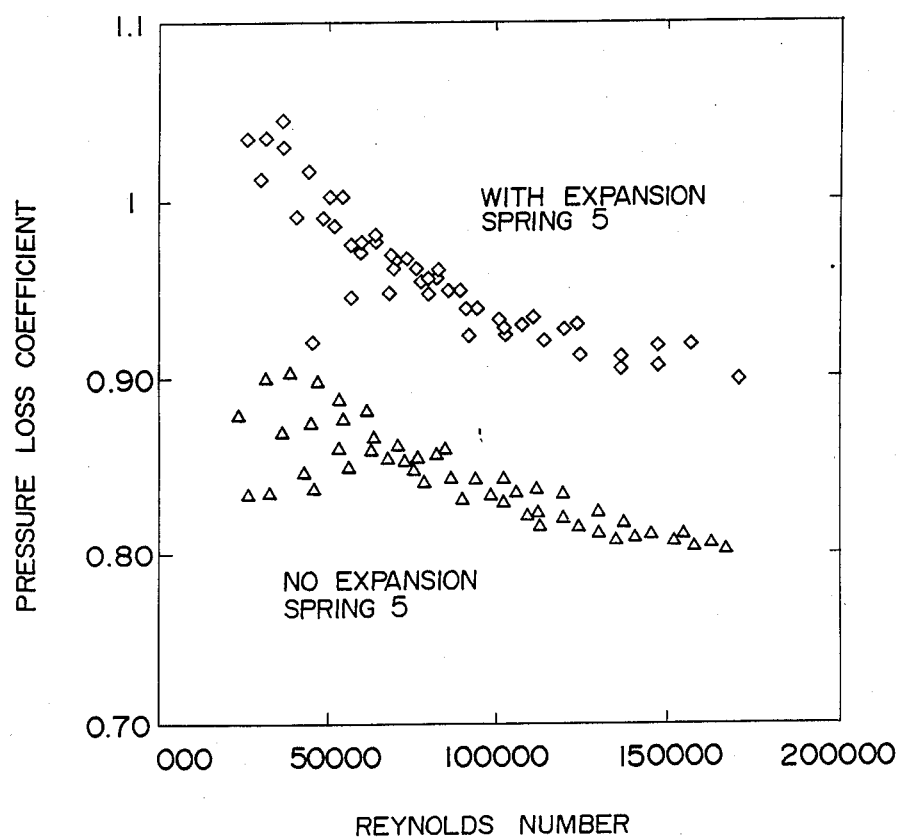
FIG. 3 is a characteristics graph illustrating the relationship between the Reynolds number and the pressure loss coefficient.

As can be clearly seen from Table 1, there is virtually no pressure loss caused by friction. The pressure loss $\Delta P_s$ due to the expansion spring 5 shares 12% of the total pressure loss at the upper portion of the fuel assembly. FIG. 3 shows the measured pressure loss coefficient of a fuel assembly with and without expansion spring 5. FIG. 3 shows a change in the above-described coefficient of pressure loss with respect to the change in the rate of the coolant flow. The pressure loss coefficient of the top end of fuel assembly changes substantially 10% in accordance with the presence of the expansion spring 5.

A group including the inventors of the present invention studied various structures which can realize reduction in pressure loss in the region at which the expansion spring 5 is mounted, and consequently found a structure formed in such a manner that the expansion spring is surrounded by a cover. An embodiment of the present invention in which a structure of the type described above will now be described.

Figure 4:
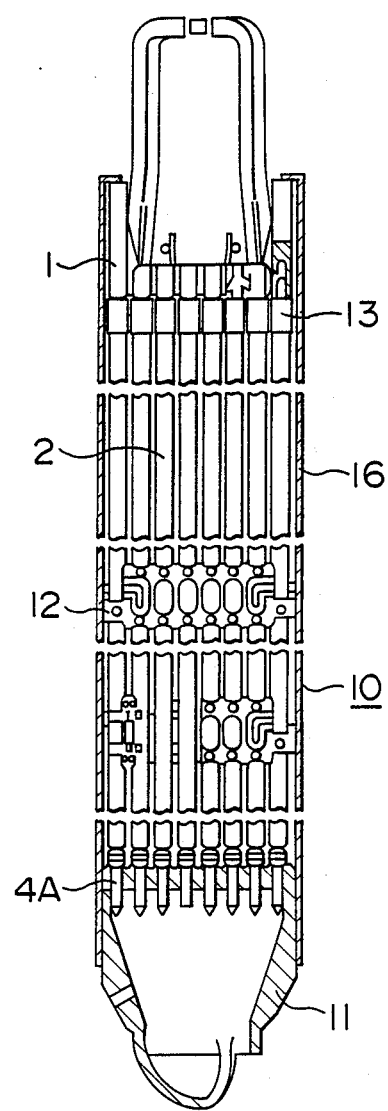
FIG. 4 is a side elevational view illustrating a fuel assembly according to a preferable embodiment of the present invention.

A fuel assembly according to a preferred embodiment of the present invention for boiling water reactors will now be described with reference to FIGS. 4 and 5. A fuel assembly 10 according to the present invention comprises an upper tie plate 1, fuel rods 2, a lower tie plate 11, spacers 12, a cap 13, and a channel box 16. The upper tie-plate 1 comprises, as described above, bosses 1A and ribs 1B. The fuel rods 2 are disposed in a square pattern, i.e., in a configuration of eight rows and eight columns. The upper end plugs 4 of the fuel rods 2 are supported by the upper tie-plate 1, and the lower end plugs 4A of the fuel rods 2 are supported by the lower tie-plate 11. A plurality of spacers 12 are axially disposed so as to support the fuel rods 2 at predetermined intervals with respect to each other. A channel box 16 secured to the upper tie-plate 1 surrounds the bundle of the fuel rods 2 which are bound by the spacers 12. The fuel rods 2 are sealed by the upper end plug 4 and the lower end plug 4A at the two ends of a cladding 2A. This sealed cladding 2A is filled with a number of fuel pellets 2B including uranium oxide. The upper end portion of the cladding 2A is provided with a gas plenum 2J. Coil springs 2C, which press the fuel pellets 2B are disposed in the gas plenums 2J. An expansion spring 5 in the form of a coil spring is fitted to the upper end plug 4.

Figure 6:
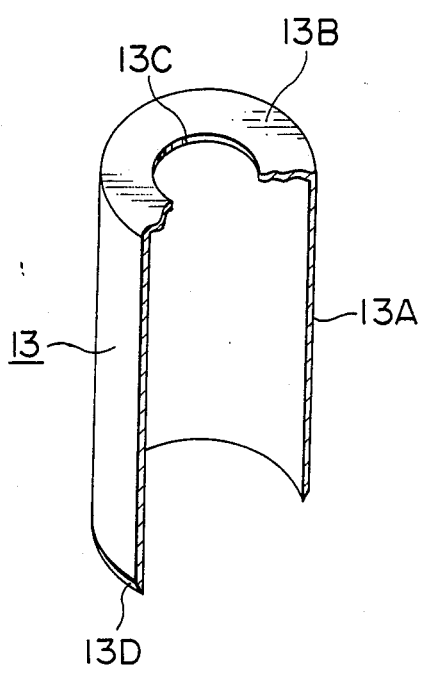
FIG. 6 is a perspective view of the cap shown in FIG. 4.

A cap 13 is fitted to the upper end plug 4. The cap 13 comprises, as shown in FIG. 6, a cylindrical cover portion 13A and a ring-type supporting portion 13B. The supporting portion 13B is disposed at the top end of the cover portion 13A. The supporting portion 13B is fitted to the upper end plug 4 by inserting the upper end plug 4 into a hole 13C formed in the central portion. The expansion spring 5 is disposed within the cap 13, and is surrounded by the cover portion 13A of the cap 13. The top end of the expansion spring 5 is positioned in contact with the supporting portion 13B so that the cap 13 is abutted against the boss 1A of the upper tie-plate 1. The inner diameter of the cover portion 13A is arranged to be larger, by a certain extent, than the outer diameter of the fuel rod 2 so as to absorb the radial expansion of the fuel rod 2 during operation of the reactor, whereby if the axial length of the fuel rod 2 is changed due to the thermal expansion in the axial direction, the fuel rod 2 can be easily moved in the cap 13. Furthermore, the outer diameter of the boss 1A of the upper tie-plate 1 is substantially coincident with that of the cap 13. Since the wall thickness of the cap 13 is sufficient to be substantially 0.5 mm in the viewpoint of corrosion resistance and strength, the difference between the outer diameter of the boss 1A and that of the fuel rod 2, that is, the cladding 2A, is substantially 1.0 mm. The height of the cap 13 is arranged to be an extent which does not cause the cap 13 to be separated from a large diameter portion in the lower end portion of the upper end plug 4 even if the length of the fuel rod 2 is reduced due to the stoppage of the operation of the reactor. That is, at the time of manufacturing the fuel assembly 10, the cap 13 must have the height which is sufficient to cover a large diameter portion 4G of the upper end plug 4 and the cladding 2A by 2.0 to 3.0 cm. The lower end of the cap 13 is, as shown in FIG. 6, preferably be provided with a slanting surface 13D in order to prevent the increase in pressure loss due to the separation of the flow of the coolant. In this case, the cap 13 and the expansion spring 5 may be mounted on the upper end plug 4. This causes the assembling of the fuel assembly to be easily conducted.

Figure 7:
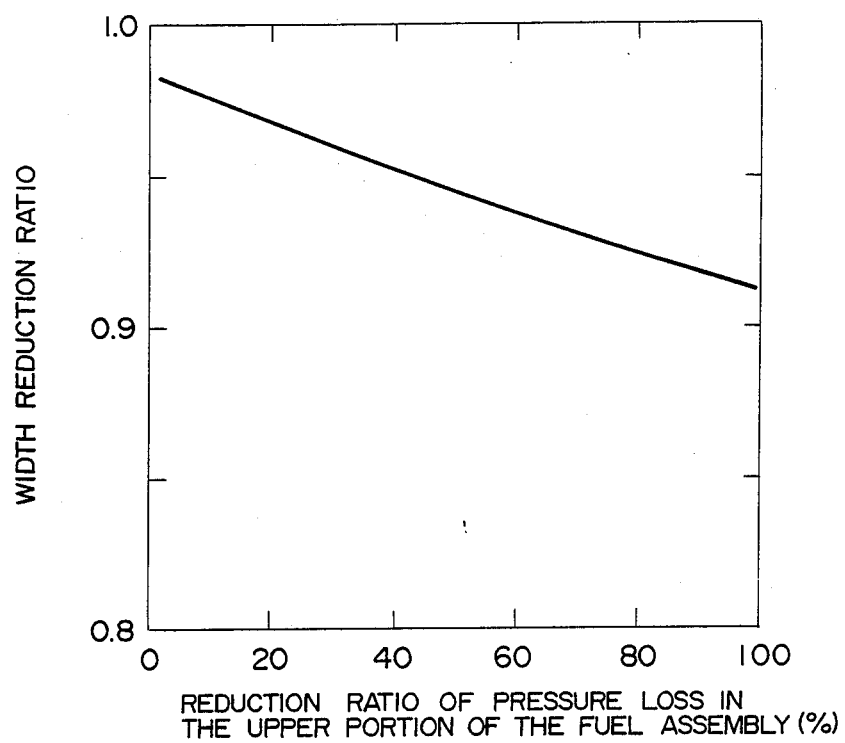
FIG. 7 is a characteristics graph illustrating the relationship between the ratio of the reduction in pressure loss in the top portion of the fuel assembly and the decay ratio of the core.

By virtue of provision of the cap 13, the flow area change in the vicinity of the upper end plug 4 can be removed and the expansion spring 5 is prevented from being brought into direct contact with the coolant flow. Therefore, the pressure loss caused from the flow area change and the same caused by the expansion spring 5, that is, pressure losses $\Delta P_a$, $\Delta P_s$, $\Delta P_b$ and $\Delta P_c$ shown in Table 1 can be eliminated. On the other hand, an increase in pressure loss caused from the cap 13 is a small loss which is substantially the same as that caused by friction. Therefore, the pressure loss in the upper portion of the fuel assembly 10 according to the present invention can be reduced by substantially 70% with respect to that generated by the conventional fuel assembly. This causes, as can be clearly seem from FIG. 7, the stability of the reactor core in which the fuel assembly 10 is mounted can be improved by substantially 5% in comparison to that of the conventional one. FIG. 7 illustrates the relationship between the pressure loss in the upper portion of the fuel assembly and the decay ratio which is the index of the stability of the reactor core. The pressure loss reduction rate in the upper portion of the fuel assembly represented by the abscissa of FIG. 7 is estimated based on the pressure loss in the upper portion of the conventional fuel assembly. When the decay ratio is 1.0 or less, the core is in a stable state. The smaller the value of the decay ratio is, the more the stability improves.

The above-described reduction in pressure loss will cause the reduction in the power of the recirculation pump which supplies the coolant to the reactor core. Furthermore, since the cap 13 is pressed to the boss 1A by the urging force of the expansion spring 5, an effect can be obtained in which the lateral vibration of the fuel rod 2 can be prevented.

According to this embodiment, a pressure loss in the upper end portion of the fuel assembly can be reduced to substantially 30% of that of the conventional one so that the margin of the stability of the reactor core can be improved by substantially 5%.

Figure 8:
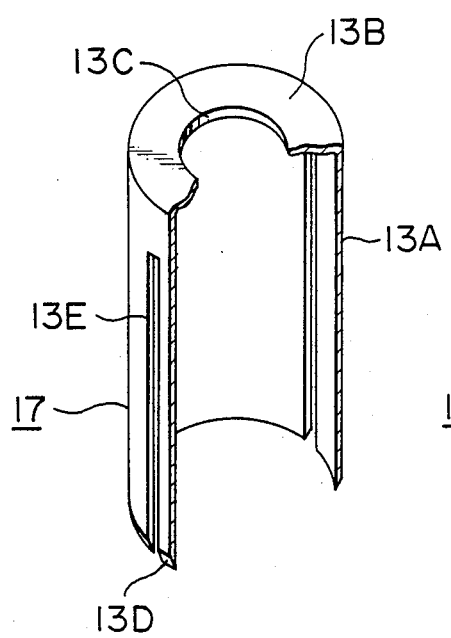
FIGS. 8 and 9 are perspective views of a cap according to other embodiments.

Another embodiment of the cap 13 is shown in FIG. 8. A cap 17 according to this embodiment is formed in such a manner that the cover 13A for the cap 13 is provided with two elongated slits 13E extending upwardly from the bottom. By virtue of mounting the cap 17 as an alternative to the cap 13 on the fuel assembly 10, the coolant is introduced into and discharged from the cap 17 through the slits 13E. As a result, a generation of corrosion in the cap 17 due to the stagnation of the coolant and deposit or the like can be prevented.

Figure 9:
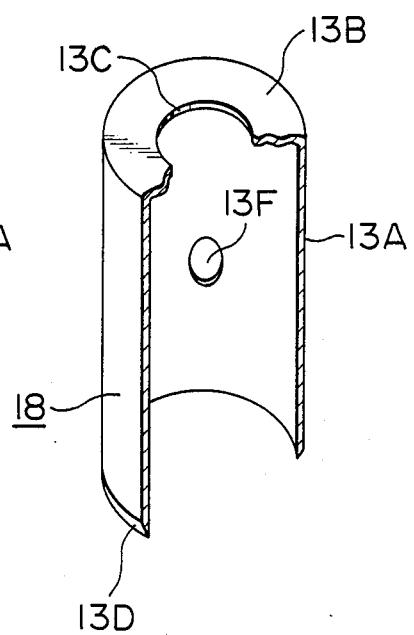

A cap according to a further embodiment is shown in FIG. 9, the cap having the same function as that of the cap 17. A cap 18 according to this embodiment has a plurality of openings 13F in the cover portion 13A. The size of the opening 13F is arranged to be sufficiently small so as not to generate any pressure loss exceeding the pressure loss caused by friction. Similarly, the above-described slits 13E must be also small in width. The coolant can be flowed into and discharged from the cap 18 through the openings 13F.

Figure 10:
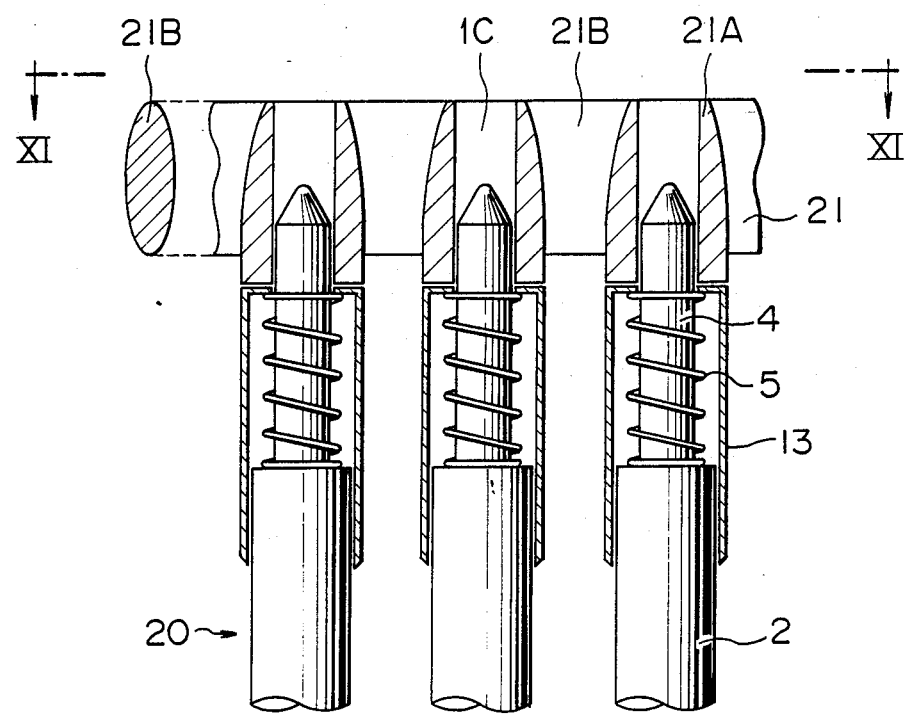
FIGS. 10, 12, 17 to 21 are structural views of an upper tie plate portion of a fuel assembly according to other embodiments of the present invention.
Figure 11:
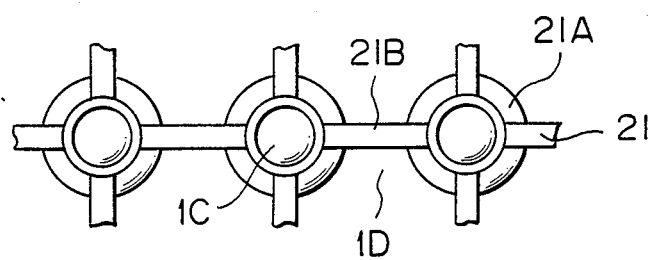
FIG. 11 is a cross-sectional view taken along the line XI—XI of FIG. 10.

A fuel assembly according to another embodiment of the present invention will now be described with reference to FIGS. 10 and 11. A fuel assembly 20 according to this embodiment differs only in the structure of the upper tie-plate from the fuel assembly 10. An upper tie-plate 21 according to this embodiment has a plurality of cylindrical bosses 21A disposed in a lattice manner and ribs 21B for connecting these bosses 21A. The boss 21A is formed in a streamline shape arranged in such a manner that the side cross sectional area thereof is reduced at the upper portion thereof, that is, in an outlet portion for the coolant passage formed in an upper tie-plate 21, toward this outlet. The rib 21B has, as shown in FIG. 10, an oval vertical cross sectional shape formed in such a manner that it is elongated along the flow direction. Since the upper tie-plate 21 is manufactured by casting, a streamline structure of the type described above can be easily manufactured.

Since the fuel assembly 20 comprises the cap 13 which surrounds, similarly to the fuel assembly 10, the expansion spring 5, pressure losses $\Delta P_a$, $\Delta P_s$, $\Delta P_b$ and $\Delta P_c$ shown in Table 1 can be eliminated. Furthermore, since the fuel assembly 20 has the bosses 21A and 21B whose downstream sides are formed in a streamline shape, the pressure loss $\Delta P_d$ due to enlargement at the outlet shown in Table 1 can be reduced to substantially 50%. Therefore, the pressure loss in the upper portion of the fuel assembly 20 can be reduced to substantially 20% of that of the conventional one. The stability of the reactor core in which this fuel assembly 20 is mounted can be improved by 6% in comparison to that of the reactor core in which the conventional one is mounted.

Figure 12:
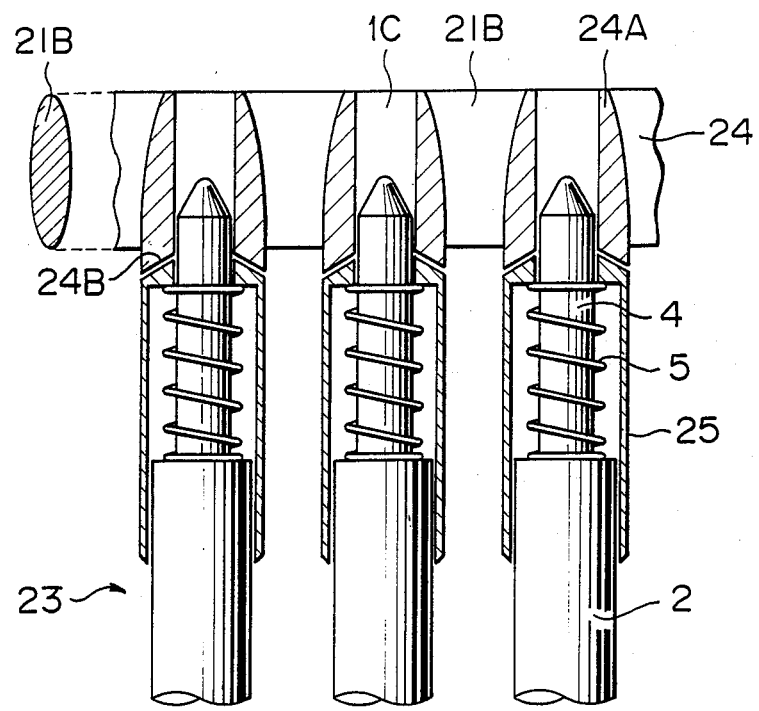
Figure 13:
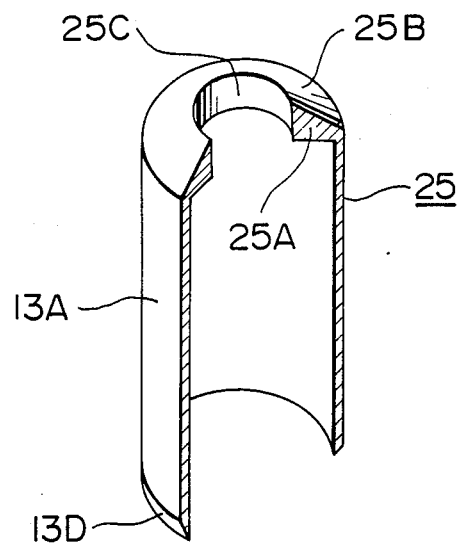
FIG. 13 is a perspective view of the cap shown in FIG. 12.

A fuel assembly according to a further embodiment of the present invention is shown in FIG. 12. A fuel assembly 23 according to this embodiment is constituted in such a manner that the upper tie-plate 21 of the fuel assembly 20 is replaced by an upper tie-plate 24 and the cap 13 is replaced by a cap 25. The upper tie-plate 24 comprises bosses 24A and ribs 21B for connecting the neighboring bosses 24A. The boss 24A is formed in such a manner that the lower side of the boss 21A according to the above-described embodiment is provided with a recess 24B formed by a slanting surface. The cap 25 is, as shown in FIG. 13, comprises the cover portion 13A and a supporting portion 25A disposed above the cover portion 13A. the supporting portion 25A comprises, at the central portion thereof, a hole 25C which is smaller in diameter than the inner diameter of the cover portion 13A but slightly larger than the outer diameter of the small diameter portion of the upper end plug 4. The upper surface of the supporting portion 25A is arranged to be a slanting surface 25B having the same degree of inclination as that of the slanting surface of the recess 24B. In a state wherein the cap 25 is mounted on the upper end plug 4 and this upper end plug 4 is inserted into the hole 1C, the upper surface (slanted surface 25B) of the supporting portion 25B of the cap 25 is engaged with the recess 24B in the boss 24A. The cap 25 surrounds the expansion spring 5 fitted to the top cap 4.

The same effect as that obtained by the fuel assembly 20 can be obtained from the above-described fuel assembly 23. Furthermore, since, in the fuel assembly 23, the bosses 24A and the caps 25 are engaged with each other, no level difference is generated between the side surface of the cap 25 and the side surfaces of the boss 24. Hence, the generation of unnecessary pressure loss can be prevented. Furthermore, during operation of the reactor, the cap 25 can be prevented from being slipped laterally. When the upper end plug 4 is inserted into the hole 1C, the slanting surface of the recess 24B serves as a guide for the insertion of the upper end plug 4. Therefore, it can be significantly easily conducted to fit the fuel rod 2 to the upper tie plate 24. Furthermore, the recess 24B can be arranged to be provided on the lower surface of the boss 1A of the fuel assembly 10. In this case, the fuel assembly 10 uses the cap 25 as an alternative to the cap 13. The cover portion 13A of the cap 25 may be provided with slits 13D or the openings 13F in a manner similar to the cap 17 or cap 18.

Figure 14:
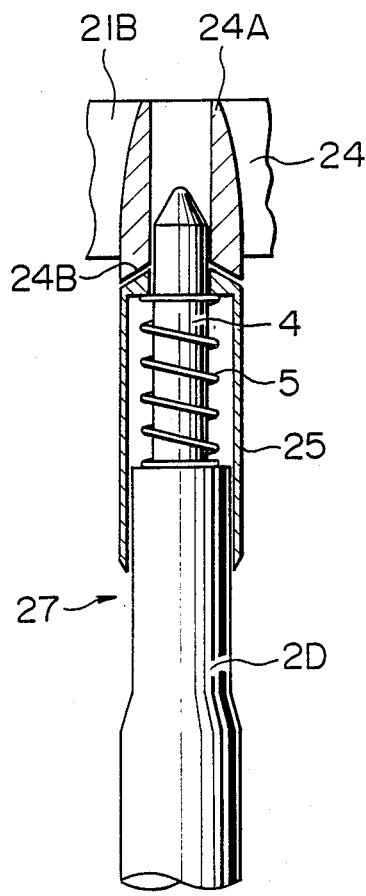
FIGS. 14 and 15 are structural views of a top portion of a fuel rod of a fuel assembly according to other embodiments of the present invention.

FIG. 14 shows a fuel assembly 27 according to another embodiment of the present invention.

The fuel assembly 27 uses, as its fuel rod, a fuel rod 2D. The other structures of the fuel assembly 27 are the same as those of the fuel assembly 23. The fuel rod 2D is formed in such a manner that the outer diameter of the upper end portion of the cladding sealed by the upper end plug 4 and the lower end plug 4, that is the outer diameter of the cladding in the portion in which the gas plenum 2J is formed, is made smaller than the outer diameter of the cladding in the portion lower than the former. As a result of this, the fuel rod 2D has a rather smaller outer diameter in the upper end portion thereof where there is no heat generation.

Since, in the fuel assembly 27, the outer diameter of the fuel rod 2D at its lower end portion is smaller, prevention of pressure loss can be improved by the degree corresponding to the degree of size reduction with respect to the fuel assembly 20.

The fuel rod 2D may be used in the fuel assemblies 10 and 20.

Figure 15:
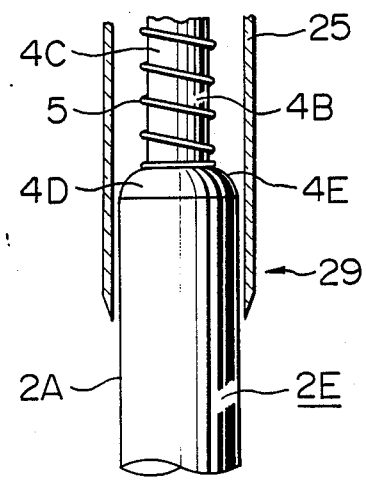

A fuel assembly 29 according to a further embodiment of the present invention will now be described with reference to FIG. 15. The fuel assembly 29 is constituted in such a manner that the fuel rods 2 of the fuel assembly 23 are replaced by fuel rods 2E. The fuel rod 2E comprises an upper end plug 4B including a small diameter portion 4C and a large diameter portion 4D having a curved surface 4E in the upper corner portion thereof. The large diameter portion 4D is disposed below the small diameter portion 4C, and is connected to the cladding 2A. Since the fuel assembly 29 has a curved surface 4E in the large diameter portion 4D thereof, the fuel rod 2E can be smoothly moved in the cap 25 when it is upwardly moved due to thermal expansion or the like. That is, in a case where the fuel rod 2E is upwardly moved within the cap 25, the large diameter portion 4E of the upper end plug 4B can be prevented from being caught by the inner surface of the cap 25. The same effect as that obtained by the fuel assembly 23 can be obtained from the fuel assembly 29. The fuel rod 2E can be applied to the fuel assemblies 10 and 20.

Figure 16:
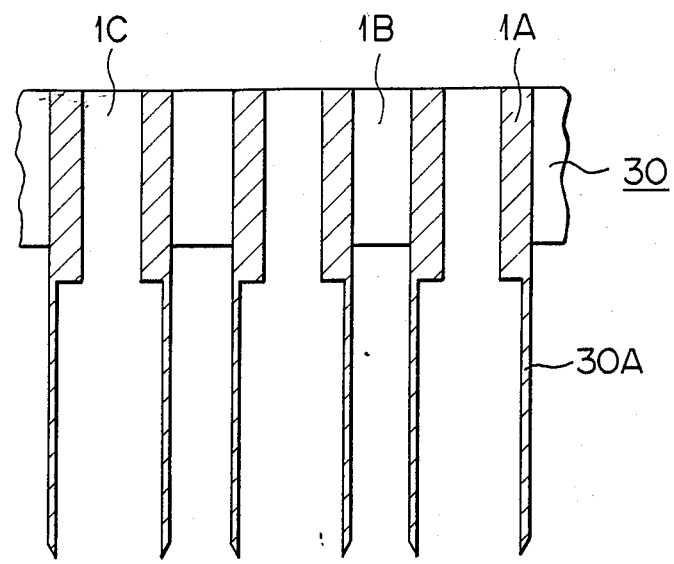
FIG. 16 is a vertical cross-sectional view of an upper tie plate according to another embodiment.

FIG. 16 shows an upper tie-plate according to another embodiment. An upper tie-plate 30 comprises, similar to the upper tie-plate 1, a plurality of bosses 1A and ribs 1B. The upper tie plate 30 is provided with a cylindrical cover portion 30A at the lower end of each boss 1A. The cover portion 30A may be provided with, similar to the cap 17 or cap 18, the slits 13E or the openings 13F. Since the upper tie plate 30 is manufactured by casting, the bosses IA and the cover portion 30A can be integrally formed so that no level difference is generated between each side surface of the bosses 1A and the side surface of the cover portion 30A.

Figure 5:
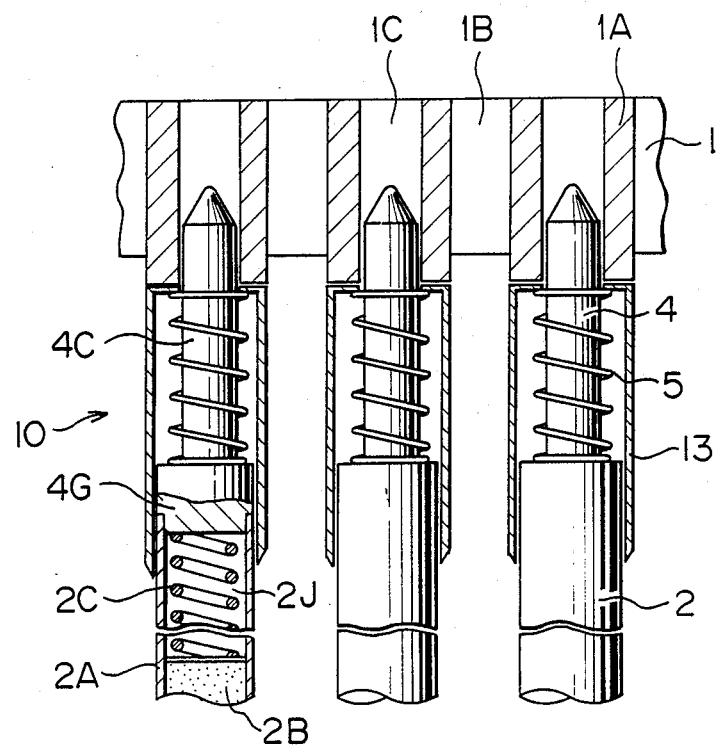
FIG. 5 is a detailed structural view of the upper tie plate portion shown in FIG. 4.

The same effect can be obtained from the fuel assembly 10 in which the upper tie-plate 1 and the cap 13 are replaced by the upper tie plate 30 as that obtained from the fuel assembly whose structure is shown in FIG. 5. The fuel assembly to which the upper tie-plate 30 is applied has the expansion spring 5 fitted to the upper end plug 4 thereof that is surrounded by the cover portion 30A.

Figure 17:
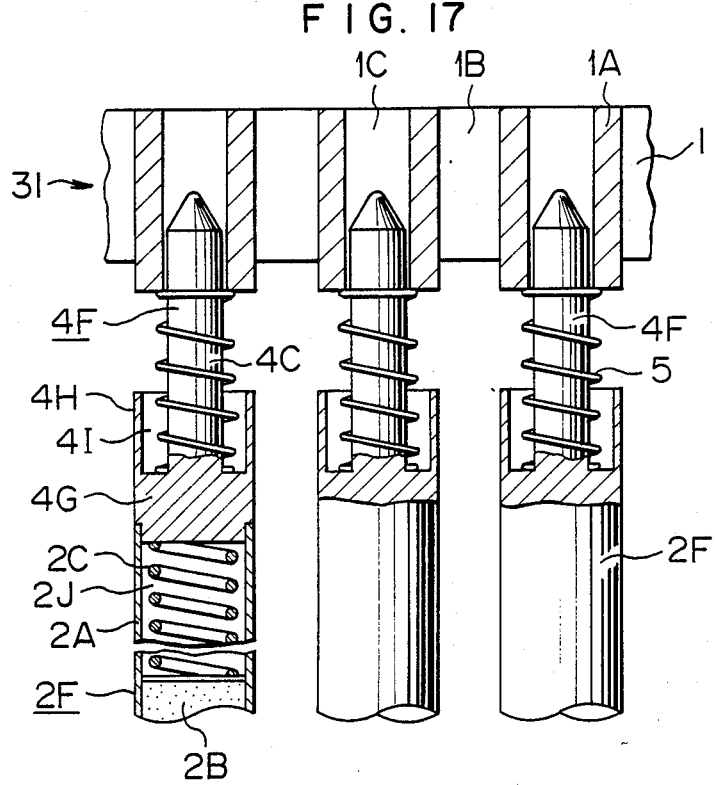

A fuel assembly 31 according to a further embodiment of the present invention is shown in FIG. 17. The fuel assembly 31 is constituted in such a manner that the cover portion 13A of the cap 13 of the fuel assembly 10 is fitted to the upper end plug 4 of the fuel rod 2. That is, a fuel rod 2F for use in the fuel assembly 31 has the cladding 2A whose top end is sealed by an upper end plug 4F. The upper end plug comprises a small diameter portion 4C, a large diameter portion 4G disposed at the lower end of the small diameter portion 4C, and a cover portion 4H disposed on the top surface of the large diameter portion 4G. The cover portion 4H is a cylinder having the same outer diameter as that of the cladding 2A and surrounds the lower portion of the small diameter portion 4C. The space between the cover 4H and the small diameter portion 4C is provided with an annular space 4I. The lower portion of the expansion spring 5 fitted to the small diameter portion 4C of the upper end plug 4F is disposed in the annular space 4I. The small diameter portion 4C, the large diameter portion 4G and the cover portion 4H are manufactured from one piece of material by grinding. Therefore the cover portion 4H is integrally formed with the large diameter portion 4G so that they are made of a continuous metallic texture. The top end of the cover portion 4H is disposed lower than the lower surface of the boss 1A. The height of the cover portion 4H is needed to be the degree not to lead a fact that the top end of the cover portion 4H is not brought into contact with the lower surface of the boss IA even if the fuel rod 2F is elongated extremely in the axial direction due to thermal expansion. In general, the axial elongation of the fuel rod 2F reaches its extreme level in the final stage of the fuel cycle of a reactor with respect to the initial stage of the same. In the initial stage of the fuel cycle, the cover portion 4H does not cover the overall length of the expansion spring 5. However, the pressure loss $\Delta P_s$ due to the expansion spring is lowered, with respect to the conventional fuel assembly, to the degree which corresponds to the fact that the expansion spring 5 is surrounded by the cover portion 4H. Therefore, in the initial stage of the fuel cycle, the pressure loss in the fuel assembly 31 is reduced in comparison to that in the conventional fuel assembly. In the final stage of the fuel cycle, since the overall length of the expansion spring 5 is substantially surrounded by the cover portion 4H, the pressure loss in the fuel assembly 31 is lowered to a degree which is the same as that of the fuel assembly 10. As for the stability of the reactor core, the same effect can be obtained.

Furthermore, the fuel assembly 31 can overcome the problems experienced with the fuel assemblies 10, 20, 23, 27 and 29. Since, in the fuel assemblies 10, 20, 23, 27 and 29 and the fuel assembly which uses the upper tie-plate 30, the fuel rod and the cover portion surrounding the expansion spring 5 are individually formed, fretting corrosion is generated in the covered pipe of the fuel rod which opposes the cover portion due to the flow-induced vibration. Furthermore, since the fuel assembly has the cover portoin 4H fitted to the fuel rod 2F, the fuel rod 2F is free from a generation of fretting corrosion due to the presence of the cover portion 4H. In the fuel assemblies 10, 20, 23, 27 and 29, since pressure loss increase if the wall thickness of the cover portion 13A becomes large, it is needed for the wall thickness of the cover portion 13A to be made thin. However, in a case where this wall thickness is made thin, the cover portion 13A is needed to be made of inconel having large strength. According to this embodiment, since the wall thickness of the cover portion 4H can be made thick, the cover portion 4H thereof can be made of a zirconium alloy that has a significantly smaller cross-section of newtron absorption than that of zirconium. Therefore, the economy of neutrons can be improved.

Figure 18:
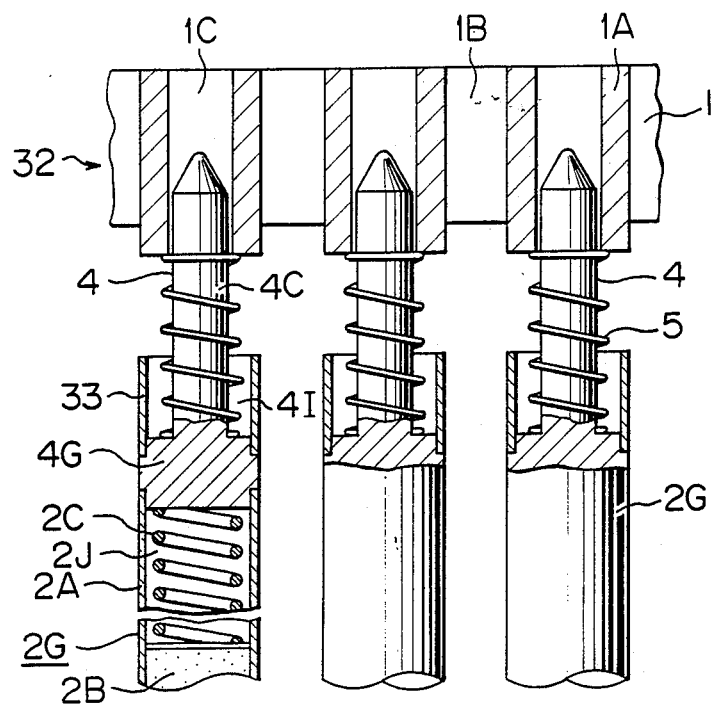

FIG. 18 shows a fuel assembly according to another embodiment of the present invention. A fuel assembly 32 according to this embodiment uses a fuel rod 2G. The fuel rod 2G has the same appearance as that of the above-described fuel rod 2F. The fuel rod 2G is formed in such a manner that a cover member 33 is secured to the large diameter portion 4G of the upper end plug 4 by welding. The cover member 33 has the same dimensions as those of the cover portion 4H. The same effect can be obtained from the fuel assembly 32 according to this embodiment as that obtained from the fuel assembly 31.

Figure 19:
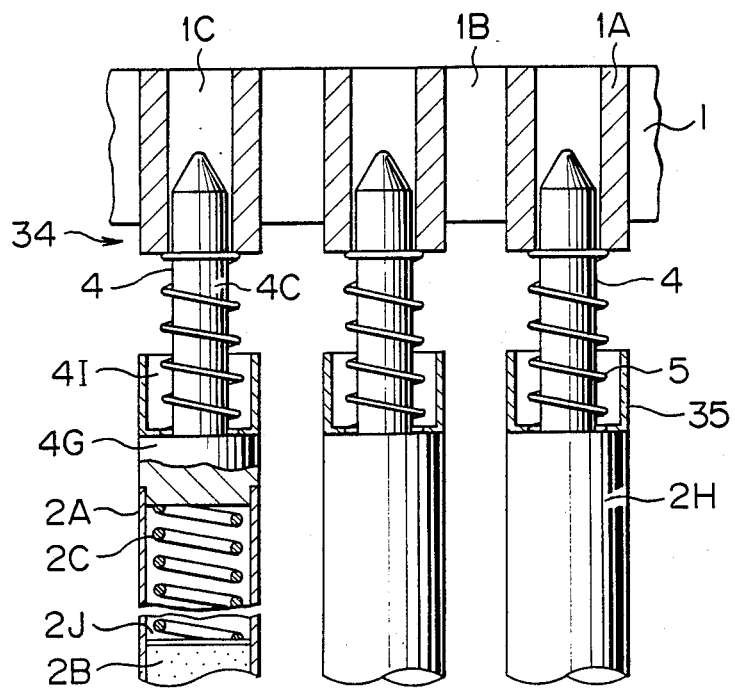

A fuel assembly according to a further embodiment of the present invention will be described with reference to FIG. 19.

A fuel assembly 34 according to this embodiment is formed in such a manner that the cylindrical cover member 33 of the fuel assembly 32 is replaced by a cover member 35 in which the cap 13 is reversed. The cover member 35 has the bottom which is welded to the upper surface of the large diameter portion 4G of the upper end plug 4 and has the cylindrical portion extending upwardly. The cylindrical portion of the cover member 35 surrounds the expansion spring 5. The fuel rod 2H comprises an upper end plug 4 on which the cover member 35 is mounted. The same effect can be obtained from the fuel assembly 23 according to this embodiment as that obtained by the fuel assembly 31. However, since the shape of the cover member 35 of the fuel assembly 34 is complicated to some extent with respect to that of each fuel assemblies 31 and 32, it is slightly difficult to be manufactured.

Figure 20:
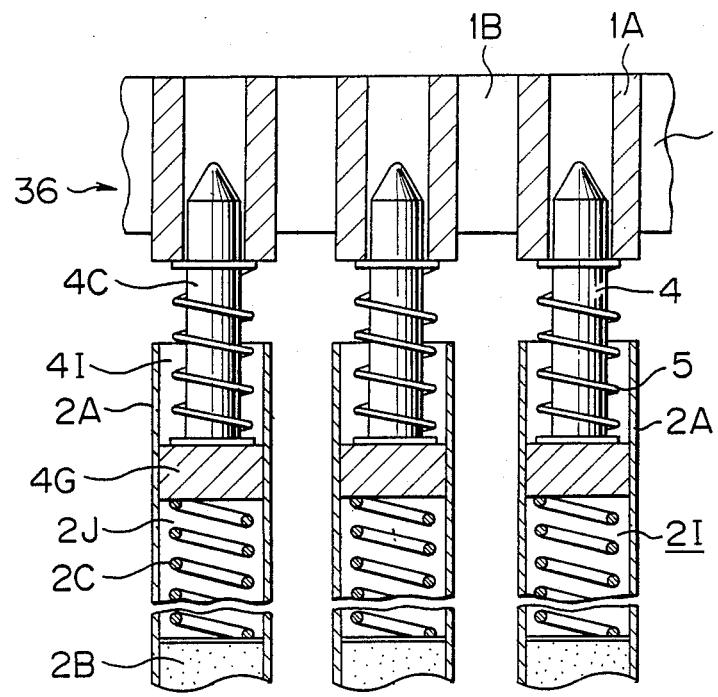

FIG. 20 shows a fuel assembly according to another embodiment of the present invention. A fuel assembly 36 according to this embodiment is formed in such a manner that the cover portion 4H and the cover member 33 shown in FIGS. 17 and 18 are each formed by the cladding 2A. That is, a fuel rod 2I used for the fuel assembly 36 is formed in such a manner that the cladding 2A thereof is lengthened with respect to that of the fuel rods 2F and 2G, the upper end plug 4 is inserted into the cladding pipe 2A, and the large diameter portion 4G and the cladding 2A are welded. The top end $2A_1$ of the cladding 2A projects upwardly over the top surface of the large diameter portion 4G. The thus-upwardly projected top end $2A_1$ has a function to serve as the cover portion. The top end 2A, surrounds the expansion spring 5. The height from the top surface of the large diameter portion 4G to the top end of the cladding 2A is the same as that of the cover portion 4H. The same effect can be obtained from the fuel assembly 36 as that obtained from the fuel assembly 31. However, in the fuel assembly 36, since the upper end plug 4 is needed to be welded from the inside of the top end $2A_1$ of the cladding 2A with the upper end plug 4 inserted into the cladding 2A, it is rather difficult to be manufactured with respect to the fuel assemblies 31, 32 and 34.

Figure 21:
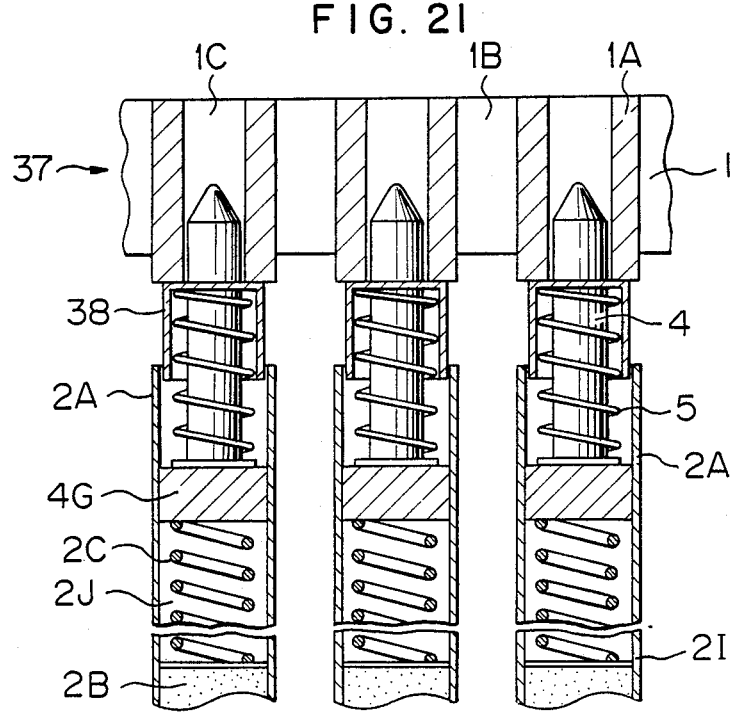

The A further embodiment of the present invention is shown in FIG. 21. A fuel assembly 37 according to this embodiment is formed in such a manner that a cap 38 is provided for the fuel assembly 36. The cap 38 is formed in such a manner that the height thereof is made smaller than that of the cap 13, and the outer diameter thereof is also made smaller than that of the cap 13. The cap 38 is positioned in contact with the lower surface of the boss 1A and is pressed upwardly by the urging force of the expansion spring 5, while the lower end portion thereof is inserted into the top end $2A_1$ of the cladding 2A. By virtue of the provision of the cap 38, the overall length of the expansion spring 5 is always surrounded by the top end $2A_1$ of the cladding 2A and the cap 38, causing the pressure loss $\Delta P_s$ to be zero, and each pressure loss $\Delta P_a$, $\Delta P_b$, and $\Delta P_c$ can also be made always close to those of the fuel assembly 10.

In the fuel assemblies 31, 32, 34, 36 and 37, the upper tie plate 1 can be replaced by the upper tie plate 24. By this replacement, the pressure loss $\Delta P_d$ of each of the fuel assemblies can be reduced to the degree achieved by the fuel assembly 20.

The fuel assemblies according to each of the above described embodiments are subjected to a fuel assembly in which the fuel rods thereof are disposed in a configuration of eight rows and eight columns (what is called an 8×8 fuel assembly). However, the structure according to each of the embodiments of the present invention can be applied to a fuel assembly in which fuel rods are disposed in a configuration of nine rows and nine columns, that is, a 9×9 fuel assembly. Each type of pressure loss (corresponding to those shown in Table 1) at the top end of the conventional 9×9 fuel assembly wherein the expansion spring 5 is not surrounded by the cover portion is shown in Table 2.

TABLE 2

| | Type of Pressure Loss | Percentage |
|---|---|---|
| Position of upper end plug | Pressure loss due to enlargement of coolant passage $\Delta P_a$ | 5.7% |
| | Pressure loss caused by expansion spring $\Delta P_s$ | 27.7% |
| | Pressure loss caused by reduction in size of coolant passage (boss) $\Delta P_b$ | 16.6% |
| Upper Tie Plate | Pressure loss caused by reduction in coolant passage size (boss) $\Delta P_c$ | 3.4% |
| | Pressure loss caused by enlargement of outlet $\Delta P_d$ | 42.0% |
| Pressure loss due to friction $\Delta P_f$ | | 4.6% |

A comparison is made between each of pressure loss in the conventional 8×8 fuel assembly (Table 1) and that of the conventional 9×9 fuel assembly (Table 2), resulting a fact that the latter fuel assembly shows a characteristic in which the ratio of the pressure loss $\Delta P_a$ is relatively lowered, but the pressure losses $\Delta P_s$ and $\Delta P_d$ are relatively increased. This is caused from a fact that in the conventional 8×8 fuel assembly, the flow area formed in the upper tie plate is smaller than that formed between fuel rods, but in the conventional 9×9 fuel assembly, an improvement is achieved in that the former flow area and the latter flow area are made same. Therefore, the pressure loss in the conventional 9×9 fuel assembly is smaller than that in the conventional 8×8 fuel assembly. As described above, in a 9×9 fuel assembly to which each of embodiments of the present invention is applied, the pressure loss can be further reduced with respect to the conventional 9×9 fuel assembly.

In the embodiment of the present invention which is formed in such a manner that the structure shown in FIG. 5 is applied to the 9×9 fuel assembly, the pressure losses $\Delta P_a$, $\Delta P_s$, $\Delta P_b$ and $\Delta P_c$ are, similar to those in the fuel assembly 10, reduced virtually to zero, the pressure loss at the top end can be reduced to substantially 47% of the conventional 9×9 fuel assembly. In a 9×9 fuel assembly which is formed in such a manner that the structure shown in FIG. 12 is applied, the pressure loss at the top end thereof can be reduced to substantially 75% of that of the conventional 9×9 fuel assembly.

What is claimed is:

1. A fuel assembly comprising:
an upper tie-plate having a plurality of cylindrical bosses and a plurality of ribs which connect each of said bosses;
a plurality of fhel rods having each of top and lower ends which is sealed by a corresponding end plug, which are filled with a plurality of fuel pellets, and in whcih said upper end plug is supported by said boss;
expansion springs secured to said upper end plugs of said fuel rods; and
cover means provided for either said fuel rod or said upper tie-plate surrounding said expansion spring and covering at least a part of the axial length of said expansion spring.

2. A fuel assembly according to claim 1, wherein the wall thickness of said boss and said rib is gradually decreased in an outlet portion of a passage for coolant which is formed in said upper tie-plate in the direction toward said outlet.

3. A fuel assembly according to claim 1, wherein the top end of said cover means is pressed to said boss by said expansion spring while the lower end of the same surrounds a large diameter portion formed in the lower portion of said upper end plug.

4. A fuel assembly according to claim 3, wherein said cover means has openings on the side surface thereof.

5. A fuel assembly according to claim 3, wherein said top end of said cover means is fitted in the lower end of said boss so that said cover means is prevented from being moved laterally.

6. A fuel assembly according to claim 2, wherein the wall thickness of said rib is gradually decreased in an inlet portion of a passage for coolant which is formed in said upper tie-plate in the direction toward said inlet.

7. A fuel assembly according to claim 3, wherein the upper corner portion of said large diameter portion of said upper end plug is made a curved surface.

8. A fuel assembly according to claim 1, wherein said upper end plug comprises said cover means, said cover means is disposed in a large diameter portion formed in the lower portion of said upper end plug, extends upwardly, and covers an axial part of said expansion spring which is disposed between said boss and said large diameter portion.

9. A fuel assembly according to claim 8, wherein the height from the upper surface of said large diameter portion to the top end of said cover means is arranged in such a manner that said top end of said cover means cannot be brought into contact with the lower surface of said boss even if said fuel rod expands axially.

10. A fuel assembly according to claim 1, wherein said cover means is formed by a top end of a cladding fitted to said upper end plug, said top end projecting upwardly over the upper surface of said large diameter portion of said upper end plug.

11. A fuel assembly according to claim 8, wherein said cover means is secured to said large diameter portion of said upper end plug.

12. A fuel assembly according to claim 8, wherein said cover means is integrally formed with said large diameter portion of said upper end plug and the metallic texture of said cover means and that of said large diameter portion connect each other continuously.

13. A fuel assembly according to claim 1, wherein said cover means surrounds said expansion spring in the circumferential direction and covers at least a part of the axial length of said expansion spring so as to reduce pressure loss caused by the presence of the expansion spring at the upper end plug of the fuel rod.

14. A fuel assembly according to claim 1, wherein said cover means includes at least an elongated slit extending upwardly from a bottom thereof, said slit being formed so that a pressure loss caused by said slit is less than a pressure loss due to friction between said cover means and said coolant.

15. A fuel assembly according to claim 1, wherein said cover means includes at least one opening therein, said opening being formed so that a pressure loss caused by said opening is less than a pressure loss due to friction between said cover means and a coolant.

* * * * *